United States Patent
Cheshir et al.

[11] 3,889,986
[45] June 17, 1975

[54] HOSE COUPLING

[75] Inventors: Keith Cheshir; Peter Farr, both of Cheltenham, England

[73] Assignee: Dowty Mining Equipment Limited, Tewkesbury, England

[22] Filed: Oct. 2, 1972

[21] Appl. No.: 293,947

[30] Foreign Application Priority Data
Oct. 1, 1971 United Kingdom............... 45780/71

[52] U.S. Cl............................... 285/137R; 285/305
[51] Int. Cl............................................ F16l 39/00
[58] Field of Search............. 285/137 R, 25, 26, 28, 285/29, 174, 305

[56] References Cited
UNITED STATES PATENTS

| | | | |
|---|---|---|---|
| 3,125,361 | 3/1964 | Weaver | 285/137 R |
| 3,767,234 | 10/1973 | Weirich et al. | 285/137 R |

FOREIGN PATENTS OR APPLICATIONS

| | | | |
|---|---|---|---|
| 1,005,793 | 4/1957 | Germany | 285/137 R |
| 1,097,687 | 4/1965 | United Kingdom | 285/137 R |
| 1,197,447 | 7/1970 | United Kingdom | 285/137 R |

Primary Examiner—Richard J. Scanlan, Jr.
Assistant Examiner—Peter Nerbum
Attorney, Agent, or Firm—Young & Thompson

[57] ABSTRACT

A two-part hose coupling of which one coupling part at least is secured to a plurality of hoses. This one coupling part comprises a pair of spaced flanges secured together in spaced relation and a plurality of recesses in each flange for locating the hose end portions, ferrules attached one to each hose being located between the flanges whereby the hose end portions may be located in a predetermined arrangement.

10 Claims, 3 Drawing Figures

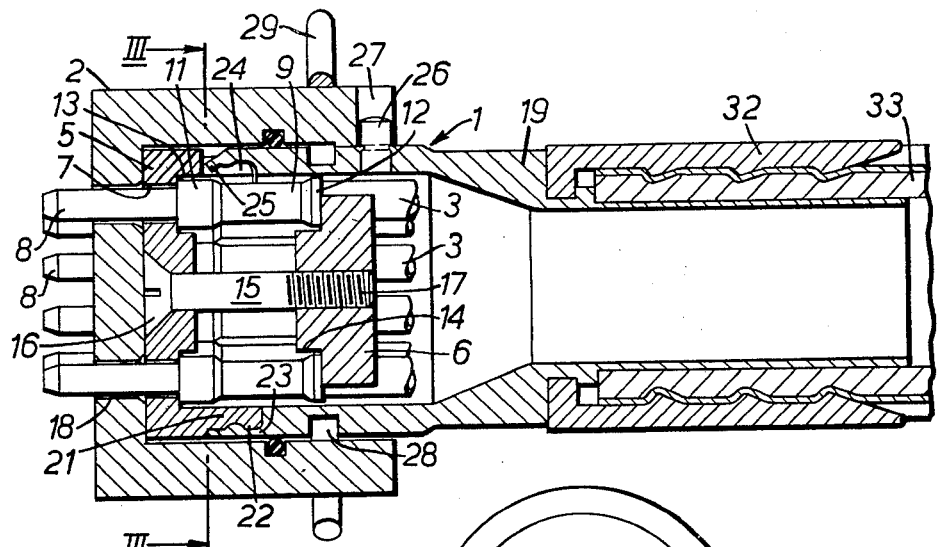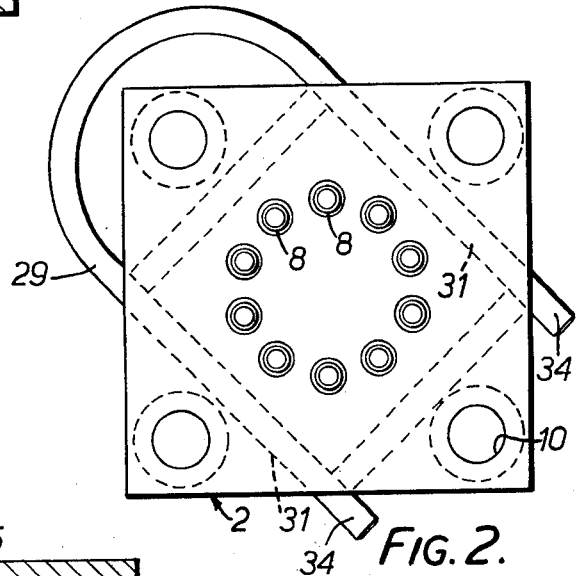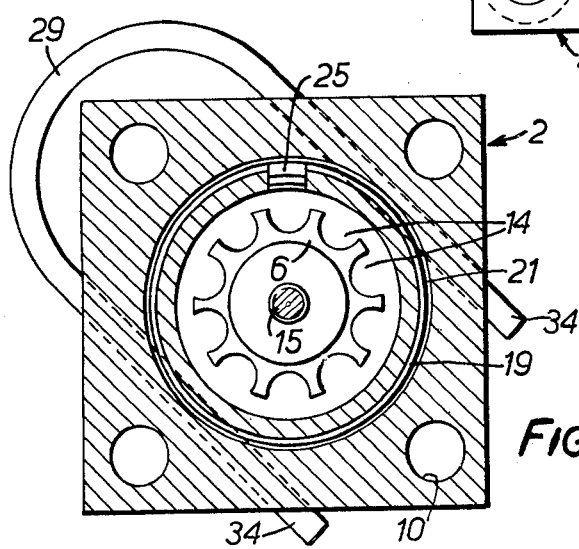

HOSE COUPLING

This invention relates to a coupling device having two parts which can be readily assembled together and readily disconnected when so assembled, each part having a plurality of fluid carrying passageways, the fluid carrying passageways of at least one part being hoses so located one with respect to the other that when the parts are assembled together a passageway of one part is associated with a corresponding passageway of the other part and connected thereto by a spigot and socket joint. This coupling device will hereinafter be referred to as a two-part hose coupling of the kind referred to.

The object of the present invention is to provide an improved two-part hose coupling.

In a two-part hose coupling of the kind referred to the one coupling part securable to a plurality of hoses comprises a pair of spaced flanges secured together in spaced relation, and a plurality of recesses in each flange for holding the hose end portions, ferrules attached one to each hose being located between the flanges, whereby the hose end portions are located by the flanges in a predetermined arrangement.

At least some of the recesses open to the outer periphery of a flange, a rigid sleeve being secured around the flanges to retain the ferrules in position.

The recesses in one flange may comprise holes extending through the flange and the recesses in the other flange may open to the outer periphery thereof.

The flanges may be secured together by screw means extending between the flanges in parallel relation with the ferrules.

The rigid sleeve may extend beyond one flange for attachment to a flexible sleeve which encloses the hoses extending from the one coupling part.

One embodiment of the invention will now be particularly described with reference to the accompanying drawings, in which FIG. 1 is a longitudinal cross-section through the two-part coupling, FIG. 2 is an end view of the two-part coupling, and FIG. 3 is a cross-section on the line III—III of FIG. 1, the ferrules having been omitted for clarity.

The two-part coupling shown mainly in FIG. 1 comprises a plug 1 which fits into a socket 2. The plug 1 is intended for attachment to the end portions of a plurality of hoses 3 whilst the socket 2 is intended for attachment by means of bolts through bolt holes 10 to a piece of hydraulic machinery such for example as a hydraulic roof support for use in a mine.

Within the plug 1 a pair of flanges 5 and 6 are provided, both being made of an artificial resin material of substantial stiffness such for example that known as Delrin. The flange 5 is circular in shape being formed with a plurality of holes 7 extending therethrough in a direction parallel to the axis of the circular form. These holes 7 are each intended to receive a spigot 8 secured to the end of a hose 3. Each spigot 8 is secured to its hose end by means of a ferrule 9 crimped into position in a conventional manner, the ferrule 9 including end portions 11 and 12 of diameters somewhat larger than the diameter of the hose 3. The flange 5 is provided with a recess 13 leading into each hole 7 of a size to receive the end portion 11 of a ferrule 9.

Whilst the holes 7 form the recesses in a flange 5, the recesses 14 of the flange 6 open to the periphery of the flange 6, each recess being substantially semi-circular in shape so as to engage against the hose 3 and at the same time to engage in the endwise direction against the end portion 12 of a ferrule.

The two flanges 5 and 6 are secured together by a screw 15 whose counter-sunk head 16 is suitably accommodated in the flange 5 and whose screw-threaded portion 17 engages in a centrally positioned screw-threaded socket within the flange 6. The amount of screw thread 17 is such that when the flanges are engaged of the ferrules 9, the screw 15 will have been rotated into the flange 6 so that all of the screw thread 17 is within the flange 6 and the unthreaded shank of the screw 15 tends to enter into the screw-threaded socket causing an effective locking or wedging of the screw 15 in position.

The spigots 8 are held by the flange 5 within a circular envelope, being equally spaced from one another. Within the socket 2 a plurality of individual sockets 18 are provided having a corresponding relative arrangement to the spigots 8 so that the spigots 8 may enter the sockets 18 when the plug 1 enters the socket 2. For simplicity no details are shown of the hydraulic passageways extending from the socket 18 into the hydraulic machine on which the socket 2 is mounted. A rigid sleeve 19 forms the outer surface of the plug 1, surrounding the flange 6 and engaging with the flange 5. An integrally formed skirt 21 extends from the flange 5 towards the flange 6 being provided with a bead 22 for engagement within a groove 23 formed interiorly of the flange 19. To provide a sufficient degree of flexibility for the skirt 21 so that bead 22 may enter groove 23 a slot 24 is formed in the skirt. A tag 25 at the end of the sleeve 19 is provided to enter the slot 24 to provide correct angular location of the sleeve 19 on to the flange 5. A pin 26 projecting from the rigid sleeve 19 is adapted to engage a slot 27 in the wall of the socket 2 to ensure correct entry of the spigots 8 into the sockets 18.

To retain the plug 1 within the socket 2, a groove 28 is formed around the rigid sleeve 19 at a position adapted to enter within the socket 2 and a U-shaped staple 29 is provided whose arms 34 enter a pair of parallel tangential holes 31 within the socket to engage the groove 28 to retain the plug 1 within the socket 2.

The rigid sleeve 19 extends considerably beyond the flange 6 and is secured in a known manner at position 32 to a flexible sleeve 33 enclosing the hoses 3.

The rigid sleeve 19 at position 32 forms a suitable position at which the plug 1 may be held in the hand for insertion into or removal from the socket 2.

The advantage of the invention is that each hose 3 may be manufactured separately with a ferrule 9 at one or both ends, each ferrule being secured strongly and permanently by known means to its hose. The coupling part forming the subject of the invention may then by virtue of its structure be secured strongly to the ferrules to maintain them in a predetermined relative arrangement for co-operation with the other coupling part. Each ferrule may be formed as shown with a spigot 8 or alternatively some or all ferrules may be formed with a socket to receive a spigot mounted with the other coupling part.

We claim:

1. A two part coupling, each part having a plurality of fluid carrying passageways, a plurality of joints each comprising a spigot member and a socket member, the parts being assembled together with each passageway of one part being associated and in alignment with a corresponding passageway of the other part, each passageway in one part carrying a joint member for cooperation with a joint member carried by the corresponding passageway in the other part, hoses secured to one coupling part forming extensions of the fluid carrying passageways therein, said one coupling part comprising a pair of circular flanges secured together in spaced relation and a plurality of recesses formed in each flange, said recesses receiving and retaining the hoses and ferrules attached one to each hose and located between the flanges, said ferrules locating the hoses in a predetermined arrangement about the periphery of said flanges, said joint members of said one part being directly secured to said ferrules so as to be in communication with fluid in said hoses.

2. A two-part coupling as claimed in claim 1 wherein at least some of the recesses open outwardly to the outer periphery of one of said flanges and including a rigid sleeve secured around the flanges to retain the ferrules in position.

3. A two-part coupling as claimed in claim 1 having holes extending from the recesses and extending through the one flange and the recesses in the other flange open to the outer periphery thereof.

4. A two-part coupling as claimed in claim 3 including a rigid sleeve secured around the flanges to retain the ferrules in position.

5. A two-part coupling as claimed in claim 1, including a screw extending between the flanges in parallel relation with the ferrules to maintain the flanges in their spaced relation.

6. A two-part coupling as claimed in claim 4 wherein the rigid sleeve extends beyond one flange and including a flexible sleeve attached to the rigid sleeve and enclosing the hoses extending from the one coupling part.

7. A two-part coupling as claimed in claim 6 wherein the rigid sleeve is secured to the periphery of the flange having the holes.

8. A two-part coupling as claimed in claim 7 wherein the rigid sleeve includes securing means said securing means securing the one coupling part to the other coupling part.

9. A two-part coupling as claimed in claim 8 wherein the other coupling part comprises a socket receiving the one coupling part and the securing means comprises an externally opening groove formed in the rigid sleeve and removable retaining means within the socket engaging with the groove.

10. A two-part coupling as claimed in claim 1 wherein at least some of the ferrules each include said spigot member projecting through one flange.

* * * * *